United States Patent
Kaneko et al.

(10) Patent No.: US 11,952,683 B2
(45) Date of Patent: Apr. 9, 2024

(54) ACTUATOR DEVICE, ACTUATOR BAND, AND METHOD FOR MANUFACTURING ACTUATOR BAND

(71) Applicant: Panasonic Intellectual Property Management Co., Ltd., Osaka (JP)

(72) Inventors: Yuriko Kaneko, Nara (JP); Maki Hiraoka, Ibaraki (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 932 days.

(21) Appl. No.: 16/935,180

(22) Filed: Jul. 21, 2020

(65) Prior Publication Data

US 2020/0347525 A1    Nov. 5, 2020

Related U.S. Application Data

(63) Continuation of application No. PCT/JP2019/008786, filed on Mar. 6, 2019.

(30) Foreign Application Priority Data

May 31, 2018 (JP) ................................. 2018-104383
Feb. 14, 2019 (JP) ................................. 2019-024082

(51) Int. Cl.
*D02G 3/38* (2006.01)
*D04B 1/14* (2006.01)
(Continued)

(52) U.S. Cl.
CPC ................. *D02G 3/38* (2013.01); *D04B 1/14* (2013.01); *D04B 1/22* (2013.01); *D04B 21/20* (2013.01); *D04C 1/06* (2013.01); *H05B 3/56* (2013.01)

(58) Field of Classification Search
CPC .. F03G 7/065; D02G 3/38; D04B 1/14; D04B 1/22; D04B 21/20; D04C 1/06
See application file for complete search history.

(56) References Cited

U.S. PATENT DOCUMENTS 3,565,077 A * 2/1971 Glick ............... A61B 17/06166
                                                            428/222
4,047,533 A * 9/1977 Perciaccante ......... A61L 17/145
                                                            428/375
(Continued)

FOREIGN PATENT DOCUMENTS

JP           100829586 A   * 10/1998
JP           2007-016327      1/2007
(Continued)

OTHER PUBLICATIONS

English Translation JP100829586A (Year: 1998).*
(Continued)

*Primary Examiner* — Shafiq Mian
(74) *Attorney, Agent, or Firm* — Rimon P.C.

(57) ABSTRACT

The present disclosure provides an actuator device having a large ratio of contraction ratio to initial tension. The actuator device according to the present disclosure comprises an actuator band and a control device. The actuator band is formed by braiding, knitting, or weaving a plurality of actuator single wires. The plurality of the actuator single wires each comprise an actuator wire and a mesh-shaped heating element which covers a side surface of the actuator wire. The actuator wire is formed of a polymer fiber. The fiber is twisted around the long axis thereof and folded so as to have a cylindrical coil shape. The control device is configured to supply electric power for heating the mesh-shaped heating element. The actuator band is heated to be contracted along the longitudinal direction thereof.

20 Claims, 13 Drawing Sheets

(51) Int. Cl.
*D04B 1/22* (2006.01)
*D04B 21/20* (2006.01)
*D04C 1/06* (2006.01)
*H05B 3/56* (2006.01)

(56) References Cited

U.S. PATENT DOCUMENTS

| | | | |
|---|---|---|---|
| 4,733,603 A | | 3/1988 | Kukolj |
| 2009/0226691 A1* | | 9/2009 | Mankame ............... D07B 5/00 428/222 |
| 2012/0100386 A1 | | 4/2012 | Honma et al. |
| 2013/0298549 A1* | | 11/2013 | Manriquez, Jr. .......... F03G 7/06 60/528 |
| 2015/0152852 A1* | | 6/2015 | Li ........................... D04C 1/02 60/527 |
| 2016/0017870 A1* | | 1/2016 | Mather ................. B29C 51/002 60/527 |
| 2017/0035550 A1 | | 2/2017 | Hiraoka et al. |
| 2017/0175719 A1 | | 6/2017 | Asai |
| 2017/0292502 A1* | | 10/2017 | Tonazzini ............. B22D 19/00 |

FOREIGN PATENT DOCUMENTS

| | | |
|---|---|---|
| JP | 2008-079462 | 4/2008 |
| JP | 2012-087434 | 5/2012 |
| JP | 6111438 B | 4/2017 |
| JP | 2017-118811 | 6/2017 |
| JP | 2018-019500 | 2/2018 |
| WO | 2014/022667 | 2/2014 |

OTHER PUBLICATIONS

International Search Report of PCT application No. PCT/JP2019/008786 dated May 14, 2019.

Maki Hiraoka et al., "Large strains and their polymer chain morphologies on coiled polymer fiber actuators", Symposium of the 24th Polymer material forum, disclosed on Nov. 26, 2015, by Maki Hiraoka et al., in Tokyo Japan, Published on Nov. 15, 2015.

Maki Hiraoka et al., "Power-efficient low-temperature woven coiled fibre actuator for wearable applications", Scientific Reports vol. 6, Article No. 36358, Nov. 4, 2016, and Supplementary information.

* cited by examiner

ACTUATOR DEVICE, ACTUATOR BAND, AND METHOD FOR MANUFACTURING ACTUATOR BAND

BACKGROUND

1. Technical Field

The present invention relates to an actuator device, an actuator band, and a method for manufacturing the actuator band.

2. Description of the Related Art

Patent Literature 1 discloses coiled and non-coiled twisted nanofiber yarn and polymer fiber torsional and tensile actuators. In Non-patent Literatures 1 and 2, Maki Hiraoka et al. disclose a coiled polymer fiber formed of linear low density polyethylene. According to Non-Patent Literatures 1 and 2, the coiled polymer fiber is contracted by heat and restored by release of the heat. Patent Literature 2 discloses an actuator capable of contracting in the axial direction thereof. In addition, Patent Literature 1 discloses an example in which a plurality of coiled polymer fibers are arranged to provide an arbitrary generated force.

CITATION LIST

Patent Literature

Patent Literature 1: International publication No. 2014/022667
Patent Literature 2: U.S. Pat. No. 4,733,603
Patent Literature 3: Japanese Patent Publication No. 6111438
Patent Literature 4: Japanese Patent Application Publication No. 2007-16327

Non-Patent Literature

Non-Patent Literature 1: Maki Hiraoka et al., "Large strains and their polymer chain morphologies on coiled polymer fiber actuators" Proceedings of 24th Polymer Material Forum, Vol. 24, Page 39 (Publication Date: Nov. 15, 2015)
Non-Patent Literature 2: Maki Hiraoka et al. "Power-efficient low-temperature woven coiled fibre actuator for wearable applications" Scientific Reports volume 6, Article number: 36358 (2016)

SUMMARY

There is an upper limit to an amount of work generated due to contraction of one coiled polymer fiber. There is a case where an amount of work necessary as an actuator device is provided by arranging a plurality of coiled polymer fibers in a composite manner.

For example, in a case where a plurality of coiled polymer fibers are arranged and stacked in a composite manner, a loss such as bondage of movement generated due to friction or entanglement between the fibers may occur.

In addition, it is necessary to apply an appropriate initial tension and appropriate heat equally to a plurality of coiled polymer fibers. However, if the initial tension and the heat are not uniform, an amount of work of the actuator device is decreased. In particular, since the direction in which the initial tension is applied is opposite to the direction in which the coiled polymer fiber contracts, the initial tension decreases the amount of the work generated due to the contraction of the coiled polymer fiber. Therefore, in a case where the coiled polymer fiber is contracted by heat at a constant contraction ratio, it is preferable that the initial tension is as small as possible.

On the other hand, in order to increase the amount of the work of the actuator device, it is preferable that a contraction ratio of the coiled polymer fiber, namely, the fiber formed of a polymer, is as large as possible.

An object of the present invention is to provide an actuator device and an actuator band each having a large ratio of a contraction ratio to initial tension, and a method for manufacturing the actuator band.

The actuator device according to one aspect of the present disclosure comprises:
   an actuator band; and
   a control device,
   wherein
   the actuator band comprises a plurality of actuator single wires;
   the plurality of the actuator single wires are braided, knitted or woven;
   first ends of the plurality of the actuator single wires are connected to each other;
   second ends of the plurality of the actuator single wires are connected to each other;
   each of the plurality of the actuator single wires comprises an actuator wire and a mesh-shaped heating element which covers a side surface of the actuator wire and comprises a plurality of heating wires;
   the actuator wire is formed of a fiber consisting of a polymer;
   the fiber is twisted around the long axis thereof;
   the fiber is folded so as to have a shape of a cylindrical coil;
   the actuator wire is contracted by heat and restored by release of the heat;
   a first end of the mesh-shaped heating element is connected to a first end of the actuator wire;
   a second end of the mesh-shaped heating element is connected to a second end of the actuator wire;
   the control device is configured to supply, to the mesh-shaped heating element, electric power for heating the mesh-shaped heating element; and
   the actuator band is configured to be contracted along the longitudinal direction thereof by the heat in a state where tension has been applied along the longitudinal direction thereof.

The actuator band according to one aspect of the present disclosure comprises a plurality of actuator single wires, wherein
   the plurality of the actuator single wires are braided, knitted or woven;
   first ends of the plurality of the actuator single wires are connected to each other;
   second ends of the plurality of the actuator single wires are connected to each other;
   each of the plurality of the actuator single wires comprises an actuator wire, and a mesh-shaped heating element which covers a side surface of the actuator wire and comprises a plurality of heating wires;
   the actuator wire is formed of a fiber consisting of a polymer;
   the fiber is twisted around the long axis thereof;
   the fiber is folded so as to have a shape of a cylindrical coil;

the actuator wire is contracted by heat and restored by release of the heat;

a first end of the mesh-shaped heating element is connected to a first end of the actuator wire; and a second end of the mesh-shaped heating element is connected to a second end of the actuator wire.

The method for manufacturing an actuator band according to one aspect of the present disclosure comprises:

(a) forming an actuator wire capable of being contracted by heat and restored by release of the heat;

wherein the actuator wire is formed by twisting a plurality of fibers each consisting of a polymer with each other;

each of the plurality of the fibers is twisted around the long axis thereof; and each of the plurality of the fibers is folded so as to have a cylindrical coil shape;

(b) providing a side surface of the actuator wire with a mesh-shaped heating element to provide an actuator single wire;

(b2) preparing a plurality of actuator single wires each consisting of the actuator single wire; and (c) braiding, knitting, or weaving the plurality of the actuator single wires to provide the actuator band.

The present invention provides an actuator device and an actuator band each having a large ratio of a contraction ratio to initial tension, and a method for manufacturing the actuator band.

DETAILED DESCRIPTION OF THE EMBODIMENT

Hereinafter, the embodiment of the present invention will be described with reference to the drawings.

Figure 1:
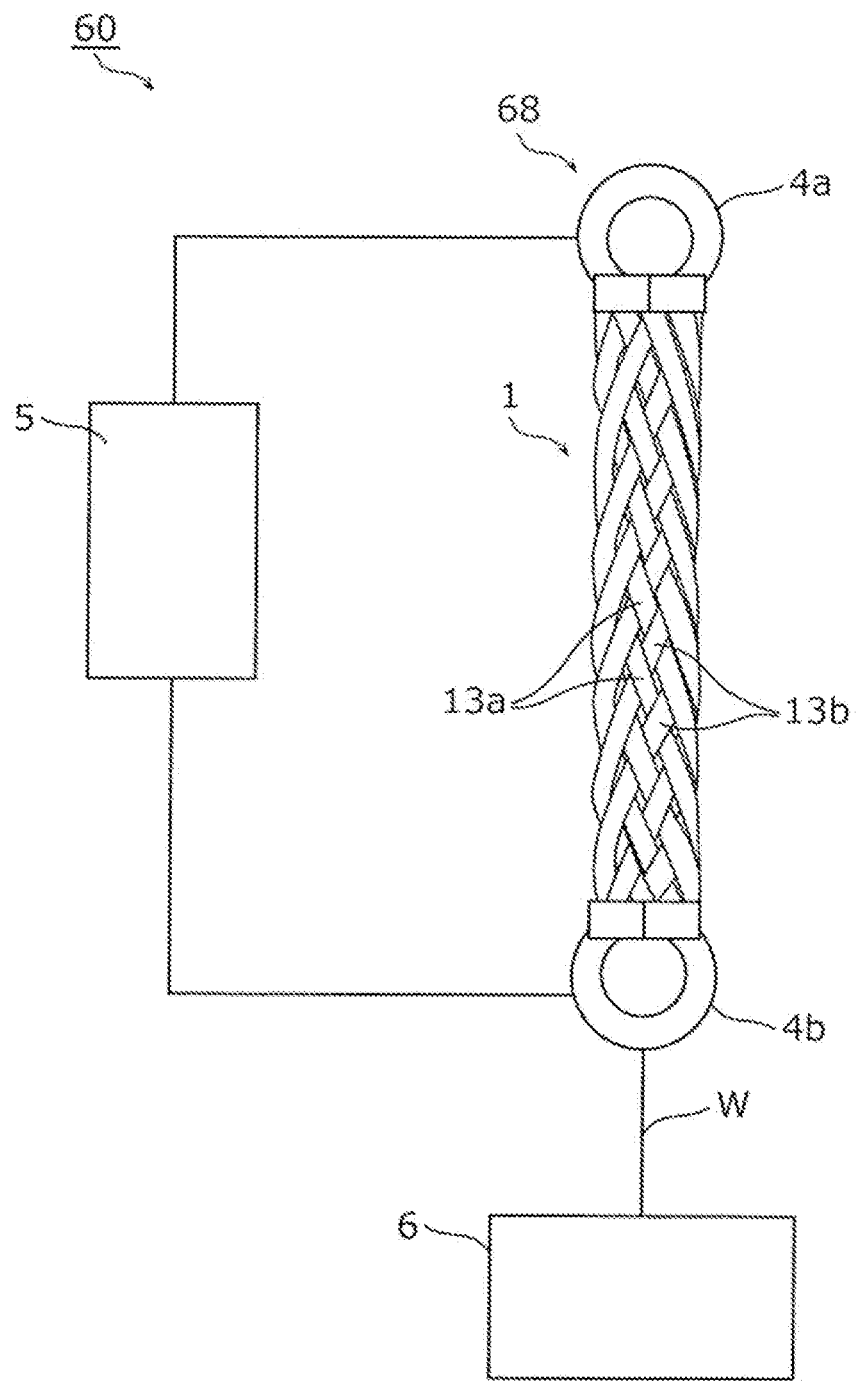
FIG. 1 is a schematic diagram showing an actuator device according to an embodiment.

FIG. 1 is a schematic diagram showing an actuator device 60 according to the embodiment. As shown in FIG. 1, the actuator device 60 according to the embodiment comprises an actuator band 1 and a control device 5. The actuator band 1 comprises a plurality of actuator single wires 13a and 13b. Hereinafter, the actuator device 60 will be described.

[Actuator Single Wire]

Figure 2A:
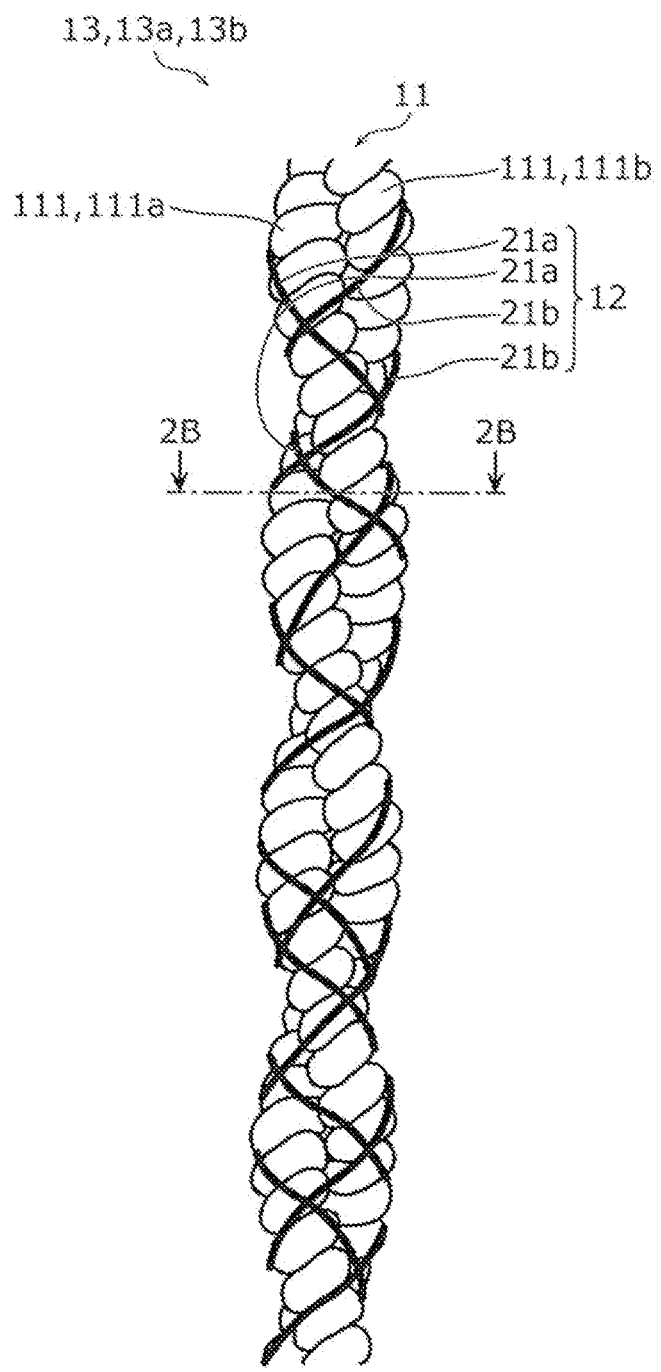
FIG. 2A is a schematic diagram showing an actuator single wire according to the embodiment.
Figure 2B:
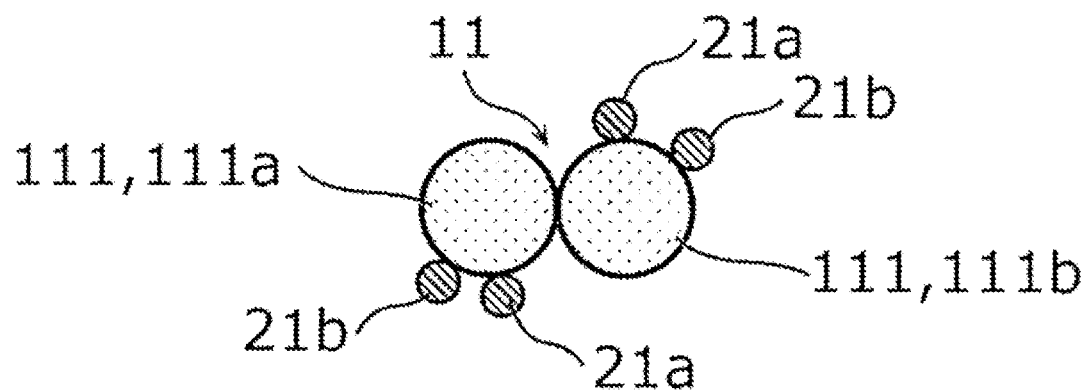
FIG. 2B is a cross-sectional view of the actuator single wire according to the embodiment.

FIG. 2A is a schematic diagram showing the actuator single wires 13a and 13b according to the embodiment. FIG. 2B is a cross-sectional view of the actuator single wires 13a and 13b according to the embodiment. FIG. 2B is a cross-sectional view taken along the line 2B-2B indicated in FIG. 2A. As shown in FIGS. 2A and 2B, the actuator single wires 13a and 13b comprises an actuator wire 11 formed by twisting two coiled polymer fibers 111a and 111b with each other and a mesh-shaped heating element 12 provided on a side surface of the actuator wire 11. The mesh-shaped heating element 12 is formed of a plurality of heating wires 21a and 21b.

Hereinafter, the actuator single wires 13a and 13b are sometimes referred to as the actuator single wire(s) 13 without distinction. The heating wires 21a and 21b are sometimes referred to as the heating wire(s) 21 without distinction. Both the coiled polymer fibers 111a and 111b are sometimes referred to as a coiled polymer fiber(s) 111 without distinction.

[Actuator Wire]

For the details of the actuator wire 11, see Patent Literature 3, which precedes the present patent application. Patent Literature 3 (i.e., Japanese Patent Publication No. 6111438) and United States Patent Application Publication No. 2015/0245145, which corresponds to Patent Literature 3, are incorporated herein by reference. In addition, the actuator wire 11 is disclosed in Non-Patent Literature 1.

The terms "actuator wire 11" and "heating element 12" used in the present specification correspond to the terms "fiber" and "temperature regulator" used in Patent Literature 3, respectively.

As disclosed in Patent Literature 3, the actuator wire 11 may be composed of a coiled polymer fiber 111 (see FIG. 3) formed of linear low density polyethylene. The actuator wire 11 is contracted by heat and restored by the release of the heat.

As one example, when the actuator wire 11 having one end to which 10 MPa of weight has been applied is heated to 90 degrees Celsius, the actuator wire 11 is contracted by approximately 23%. When the actuator wire 11 is cooled to room temperature, the actuator wire 11 is restored to its original length. As disclosed in Patent Literature 3, the actuator wire 11 may be heated to a temperature of, for example, not less than 30 degrees Celsius and not more than 100 degrees Celsius. The material of the coiled polymer fiber 111 is not limited to linear low density polyethylene, and may be a polymer having an anisotropic thermal expansion characteristic.

Other examples of the material of the coiled polymer fiber 111 include polyethylene (for example, low density polyethylene or high density polyethylene), nylon (for example, nylon 6, nylon 6,6, or nylon 12), polyester, and elastomer (for example, silicone rubber).

Figure 3:
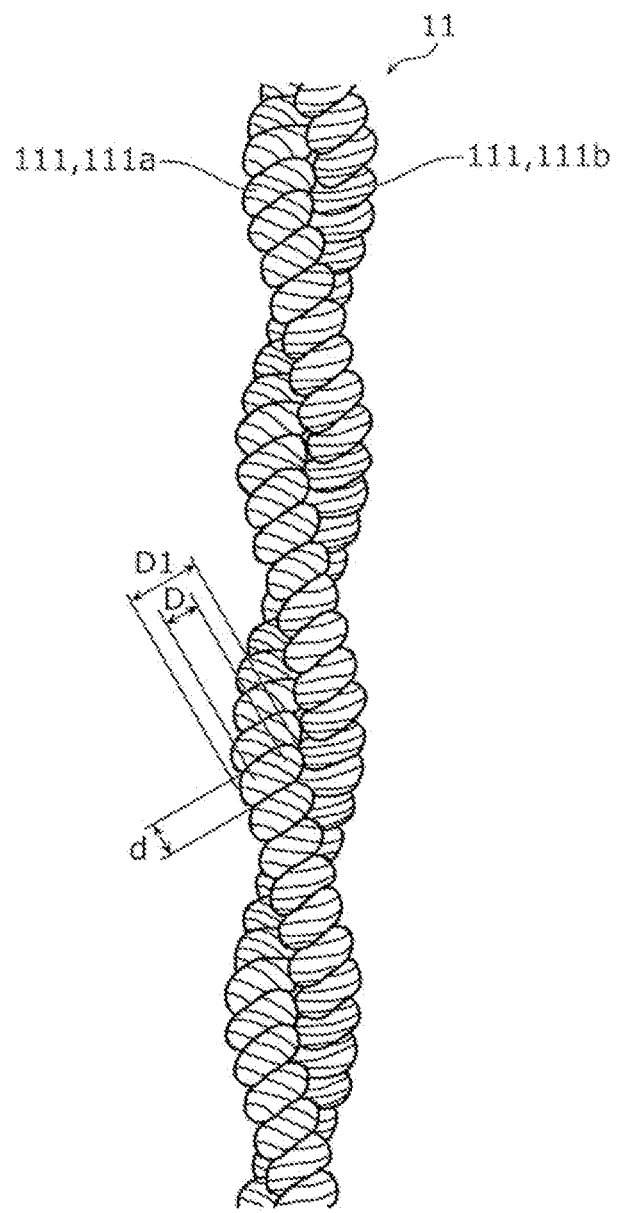
FIG. 3 is a schematic diagram showing an actuator wire according to the embodiment.

FIG. 3 is a schematic diagram showing the actuator wire 11 according to the embodiment. The actuator wire 11 may be composed of at least one coiled polymer fiber 111. For example, in FIG. 3, the actuator wire 11 may be composed of two coiled polymer fibers 111a and 111b integrated so as to be twisted with each other. Specifically, the actuator wire 11 may be composed of two or more coiled polymer fibers 111a and 111b that have been twisted with each other around the long axis thereof. In other words, the actuator wire 11 may be formed by twisting the two or more coiled polymer fibers 111 in such a manner that a side surface of one twisted coiled polymer fiber 111a is brought into contact with a side surface of another twisted coiled polymer fiber 111b.

The coiled polymer fiber 111 is twisted around the long axis thereof and folded so as to have a cylindrical coil shape (helical shape). As described in Patent Literature 3, the coiled polymer fiber 111 satisfies the following formula (I).

$$D/d < 1 \tag{I}$$

where, D represents an average diameter of the cylindrical coil of the coiled polymer fiber 111, and d represents a diameter of the coiled polymer fiber 111. Due to this relationship, a displacement rate of the actuator wire 11 can be increased. The average diameter D is provided by subtracting the diameter d of the coiled polymer fiber 111 from an outer diameter D1 of the cylindrical coil.

[Mesh-Shaped Heating Element]

As shown in FIGS. 2A and 2B, the mesh-shaped heating element 12 covers the side surface of the actuator wire 11. It is desirable that the mesh-shaped heating element 12 is cylindrical so as to include the actuator wire 11 therein. The mesh-shaped heating element 12 is composed of a plurality of the heating wires 21a and 21b. The mesh-shaped heating element 12 is formed by braiding, knitting, or weaving a plurality of heating wires 21a and 21b.

Figure 4:
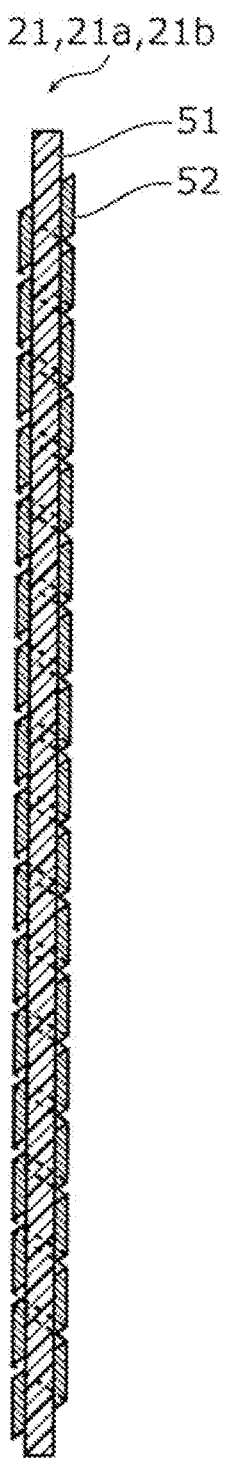
FIG. 4 is a cross-sectional view showing a heating wire according to the embodiment.

FIG. 4 is a cross-sectional view showing the heating wire 21 according to the embodiment. As shown in FIG. 4, the heating wire 21 comprises a non-conductive elastic yarn 51 which serves as a core yarn, and a metal wire 52 which covers the circumference of the elastic yarn 51. Specifically, the heating wire 21 is manufactured by a known covering processing machine using the elastic yarn 51 as the core yarn and the metal wire 52 as a sheath yarn. Here, the covering means that the metal wire 52 is wound around the elastic yarn 51 in an S direction or a Z direction. In the present embodiment, the heating wire 21 in which one line of the metal wire 52 has been wound around the elastic yarn 51 is referred to as a single covering heating wire. Note that the metal wire 52 alone may be used as the heating wire 21.

Figure 5:
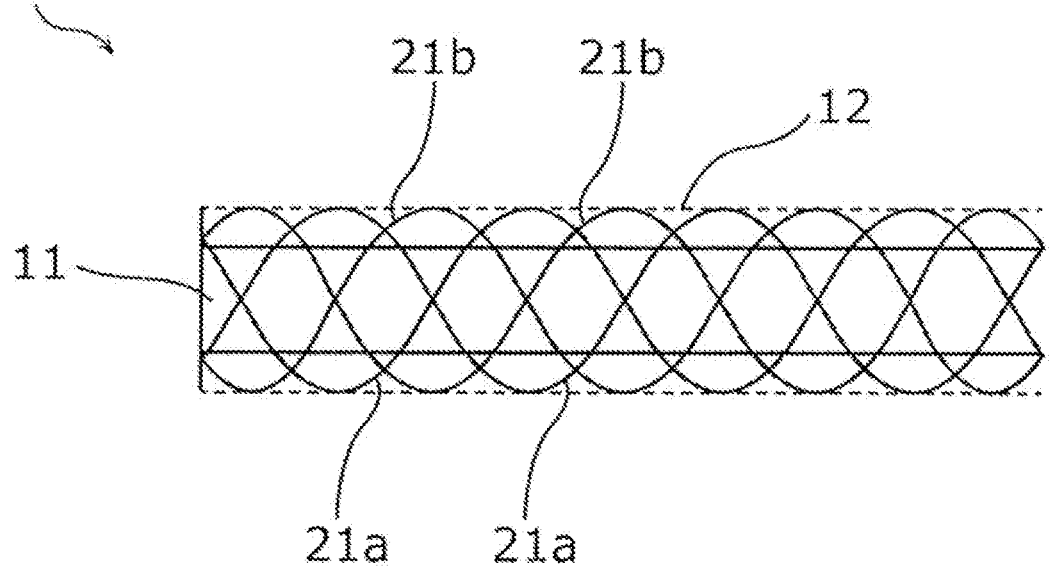
FIG. 5 is a schematic diagram showing a mesh-shaped heating element provided in the actuator single wire according to the embodiment.

FIG. 5 is a schematic diagram showing the mesh-shaped heating element 12 provided in the actuator single wire 13 according to the embodiment. As shown in FIG. 5, the mesh-shaped heating element 12 may be formed of a plurality of the heating wires 21a and 21b. It is desirable that the plurality of the heating wires 21a and 21b intersect each other in such a manner that the heating element 12 has a shape of a mesh as a whole. For example, the mesh-shaped heating element 12 shown in FIG. 2A and FIG. 5 is formed by braiding the plurality of the heating wires 21a and 21b. The heating element 12 may be formed by knitting the plurality of the heating wires 21 or may be formed by weaving the plurality of the heating wires 21.

In FIG. 5, two heating wires 21a and two heating wires 21b are braided so as to be helically wound around the outer side surface of the actuator wire 11. In this way, the mesh-shaped heating element 12 that covers the outer side surface of the actuator wire 11 is configured. For example, the heating wires 21a are braided clockwise, and the heating wires 21b are braided counterclockwise. In other words, the heating wires 21a and the heating wires 21b are braided so as to be opposite to each other around the actuator wire 11. In addition, it is desirable that the heating element 12 is configured by braiding three or more heating wires 21. As described above, each heating wire 21 is configured by covering the circumference of the elastic yarn 51 with the metal wire 52 which is used as a sheath yarn, and may have a coil (i.e., helical) shape. In addition, each heating wire 21 may have a shape of yarn.

Figure 6:
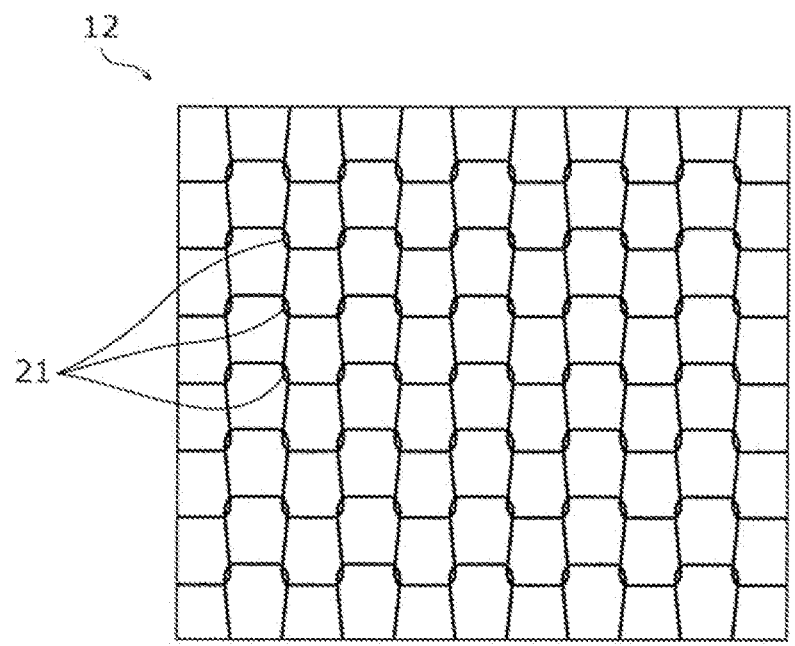
FIG. 6 is a schematic diagram showing another example of the mesh-shaped heating element according to the embodiment.

FIG. 6 is a schematic diagram showing another example of the mesh-shaped heating element 12 according to the embodiment. As shown in FIG. 6, each heating wire 21 has a shape of a rectangular wave, and the plurality of the heating wires 21 are knitted so as to form the mesh-shaped heating element 12. The heating wire 21 knitted in this way may be wound around the outer side surface of the actuator wire 11.

Figure 7:
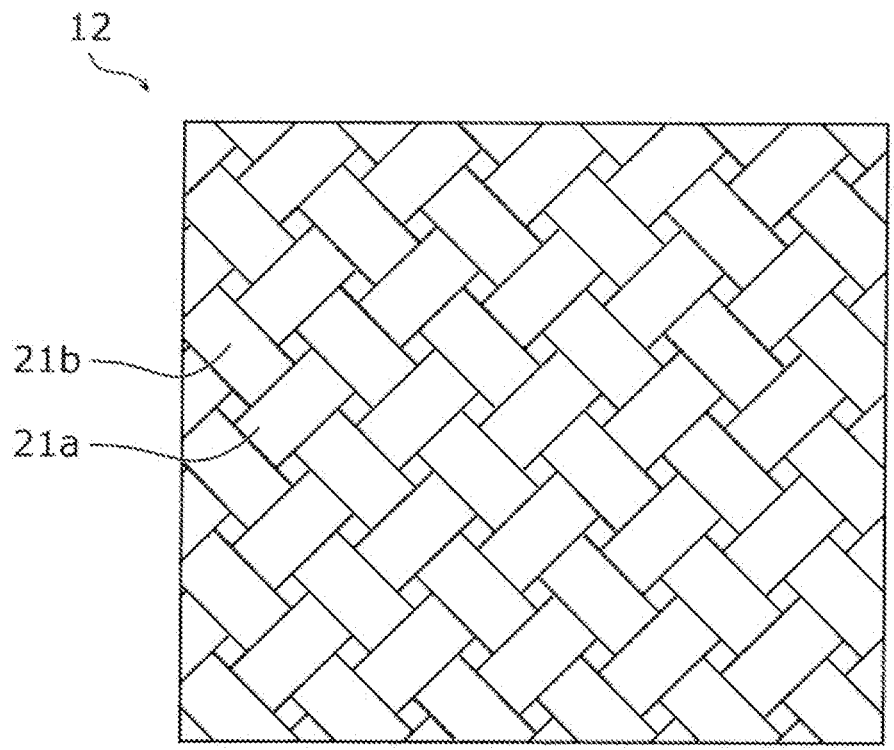
FIG. 7 is a schematic diagram showing another example of the mesh-shaped heating element according to the embodiment.
Figure 8:
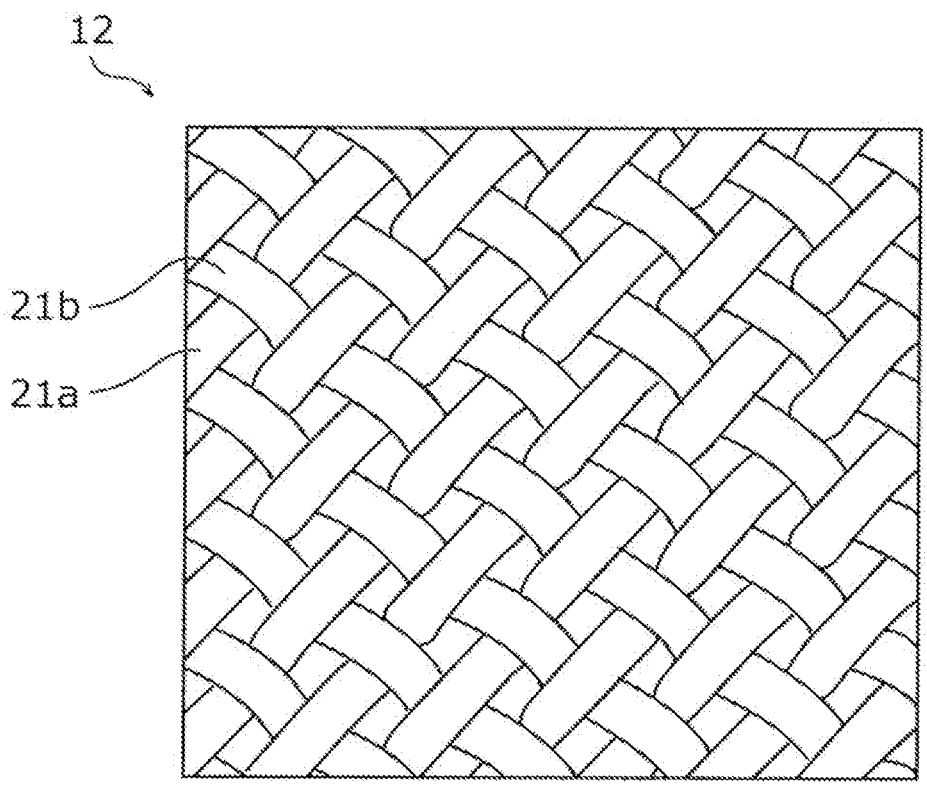
FIG. 8 is a schematic diagram showing another example of the mesh-shaped heating element according to the embodiment.

FIGS. 7 and 8 are schematic views showing another examples of the mesh-shaped heating element 12 according to the embodiment. Each of the heating wires 21a and 21b may have a shape of an elongated plate (namely, a shape of a belt). The plurality of the heating wires 21a and 21b are woven so as to be helically wound around the outer side surface of the actuator wire 11. The heating wires 21a and 21b woven in this way may be wound around the outer side surface of the actuator wire 11.

Figure 9A:
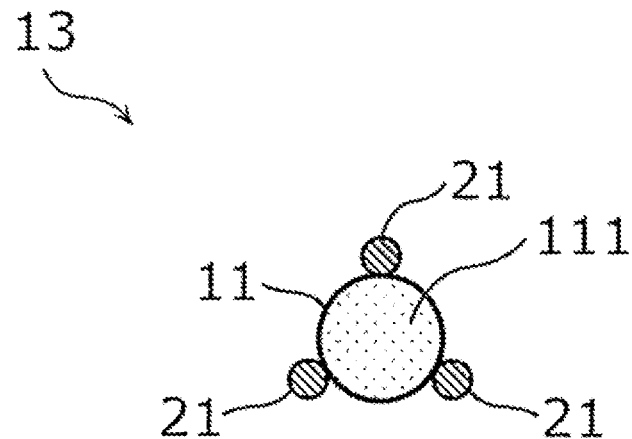
FIG. 9A is a cross-sectional view showing another example of the actuator single wire according to the embodiment.

FIG. 9A is a cross-sectional view showing another example of the actuator single wire 13 according to the embodiment. The actuator single wire 13 shown in FIG. 9A is formed of one actuator wire 11 formed of one coiled polymer fiber 111 and three heating wires 21 provided around the one actuator wire 11. Three heating wires 21 are arranged around the actuator wires 11 evenly at substantially equal angular intervals.

Figure 9B:
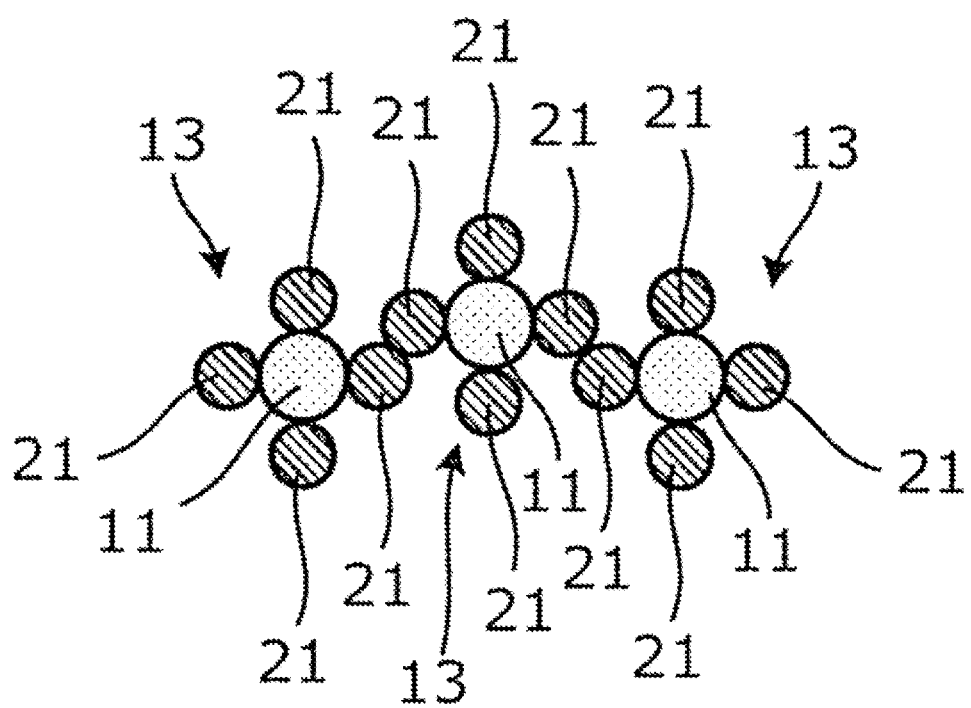
FIG. 9B is a cross-sectional view showing another example of the actuator single wire according to the embodiment.

FIG. 9B is a cross-sectional view showing another example of the actuator single wire 13 according to the embodiment. In FIG. 9B, for convenience, one actuator wire 11 is illustrated by one circle. The actuator single wire 13 is formed of the actuator wire 11 formed by twisting the two coiled polymer fibers with each other and four heating wires 21 provided around the actuator wire 11. Around the actuator wire 11, the four heating wires 21 are arranged evenly at substantially equal angular intervals.

As shown in FIGS. 9A and 9B, the plurality of the heating wires 21 are evenly arranged around the actuator wire 11, so that the actuator wire 11 can be heated more uniformly. As a result, a high contraction ratio of the actuator band 1 can be realized.

[Actuator Band]

As shown in FIG. 1, the actuator band 1 comprises the plurality of the actuator single wires 13a and 13b. The actuator band 1 shown in FIG. 1 has braided stitches each formed by the plurality of the actuator single wires 13a and 13b which intersect each other. For example, the actuator band 1 is formed by flat braiding of nine actuator single wires 13. The actuator band 1 may be formed by tubular braiding of the plurality of the actuator single wires 13.

A first connector 4a is provided at first ends of the plurality of the actuator single wires 13a and 13b. The first connector 4a is connected to a first end of the actuator band 1. Due to this connection, a first end of the cylindrical heating element 12 is connected to first ends of the plurality of the actuator wires 11. At a second end of the actuator band 1, a second connector 4b is provided. The second connector 4b is connected to the second end of the actuator band 1. Due to this connection, a second end of the cylindrical heating element 12 is connected to second ends of the plurality of the actuator wires 11. The first connector 4a and the second connector 4b are electrically connected to the control device 5 via electric wires. The first connector 4a and the second connector 4b are, for example, crimp terminals. Examples of the crimp terminal include a fork crimp terminal and a ring crimp terminal. It is desirable that the crimp terminal is formed of a metal. In this case, the heat from the heating element 12 can be released through the first connector 4a and the second connector 4b, and burnout of both ends of the actuator band 1 can be suppressed.

[Control Device]

The control device 5 supplies electric power to the mesh-shaped heating element 12 to heat the mesh-shaped heating element 12. The control device 5 may comprise a power source for supplying the electric power to the mesh-shaped heating element 12. The electric power supplied to the mesh-shaped heating element 12 is alternating current power or direct current power. The control device 5 may further comprise a switch. While the switch is on, electric power is supplied to the mesh-shaped heating element 12. While the switch is off, electric power is not supplied to the mesh-shaped heating element 12.

[Method for Manufacturing Actuator Band]

Next, a method for manufacturing the actuator band 1 will be described.

First, using a covering processing machine, the heating wire 21 is provided using the elastic yarn 51 as a core yarn and the metal wire 52 as a sheath yarn.

Next, the heating wire 21 is braided around the side surface of the actuator wire 11 to provide the actuator single wire 13 comprising the actuator wire 11 and the mesh-shaped heating element 12 which covers the surface of the actuator wire 11.

The actuator single wire 13 is formed by a well-known braider. The braider comprises a bobbin and a pulley. From the bobbin, the actuator wire 11 to which tension has been applied is supplied. The actuator wire 11 is guided by the pulley. Subsequently, the actuator wire 11 is wound together with the plurality of the heating wires 21, while the plurality of the heating wires 21 are supplied around the side surface of the actuator wire 11 via circular disks and spindles. In this way, the actuator single wire 13 comprising the actuator wire 11 and the mesh-shaped heating element 12 which covers the side surface of the actuator wire 11 is provided. The actuator single wire 13 formed by the above method is wound around a bobbin.

Next, in a well-known flat braider, nine actuator single wires 13 are braided using nine bobbins around which the actuator single wires 13 have been wound. In this way, the actuator band 1 is manufactured. The actuator band 1 can also be produced by "knitting" or "weaving" the actuator single wire 13, for example. The actuator band 1 may be formed with a tubular braider.

In general, in the flat braiding, a plurality of wires are braided in a belt shape using an odd number of bobbins, and in the tubular braiding, a plurality of wires are braided in a cylindrical shape using an even number of bobbins. In the flat braiding, the odd number of bobbins may include empty bobbins. In the tubular braiding, the even number of bobbins may include empty bobbins. By adding empty bobbins, the number of the actuator single wires 13 can be selected in accordance with an amount of the work required for the actuator device 60. It is also possible to braid a plurality of wires using a bobbin around which a dummy yarn has been wound in place of an empty bobbin. In this case, it is possible to form balanced braided stitches, namely, uniform braided stitches. The dummy wire should be as thin as possible. As the dummy wire is thinner, loss of the amount of the work of the actuator band 1 generated due to the dummy wire can be decreased.

Subsequently, the actuator band 1 is cut to a desired length. In the present embodiment, the actuator band 1 is cut in such a way that the length along a first axis x1 direction from the first end of the actuator band 1 to the second end thereof is longer than the length (width) in the second axis x2 direction perpendicular to the first axis x1 direction (see FIG. 10). In other words, the first axis x1 direction is a longitudinal direction of the actuator band 1, and the second axis x2 direction is a short direction of the actuator band 1.

The first connector 4a and the second connector 4b are attached to both ends of the actuator band 1 which has been cut to the desired length. In this way, the actuator member 68 is provided. The first connector 4a and the second connector 4b are electrically connected to the control device 5 via electric wires. In this way, the actuator device 60 is manufactured.

[Operation of Actuator Device]

Next, the operation of the actuator device 60 will be described. As shown in FIG. 1, a weight 6 is connected to the second connector 4b, which has been attached to the first end of the actuator band 1, via an electric wire W. Due to the weight 6, the actuator band 1 is provided with a predetermined tension and is turned into a tensioned state. In other words, a tension along the first axis x1 direction has been applied to the actuator band 1 with the weight 6.

Figure 10:
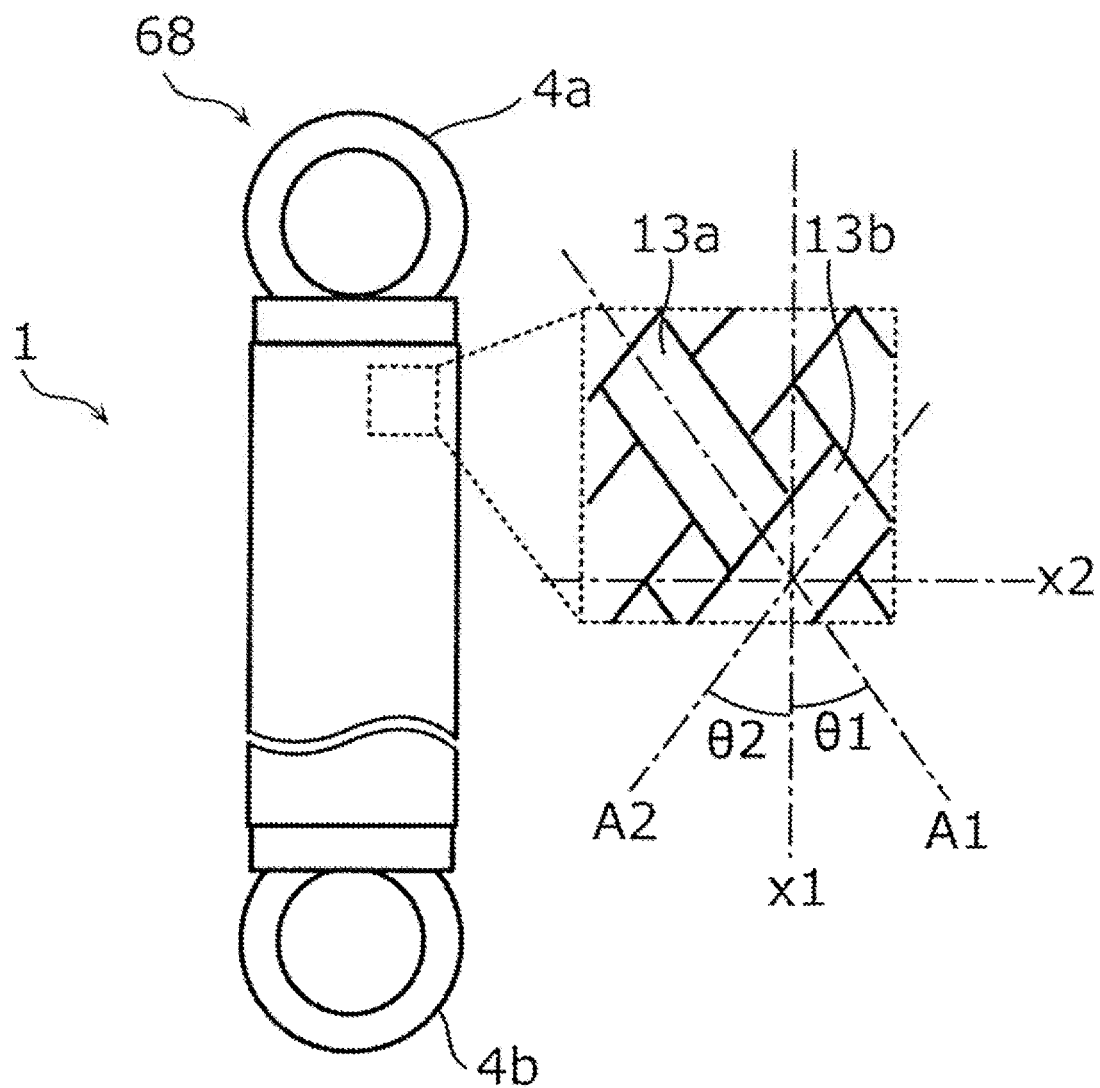
FIG. 10 is a schematic diagram showing an actuator band according to the embodiment.
Figure 11A:
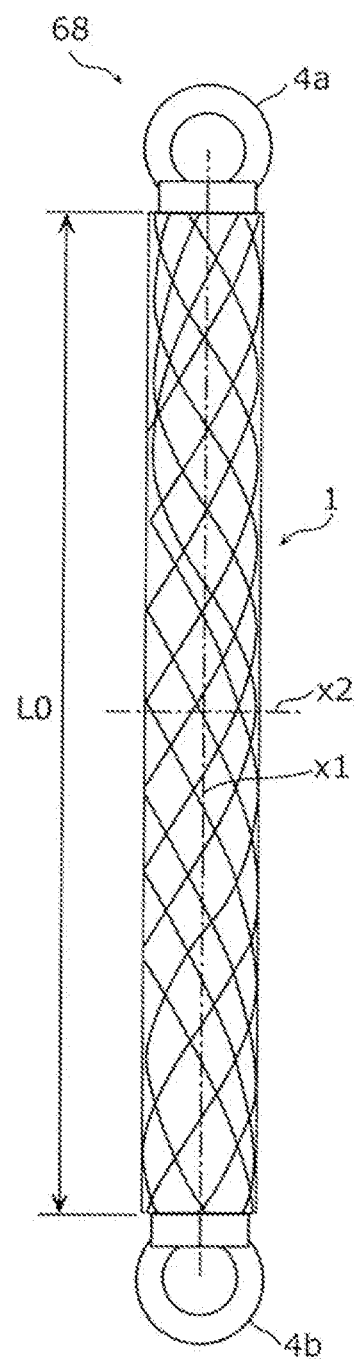
FIG. 11A is a diagram showing a state in which the actuator band according to the embodiment is not heated.
Figure 11B:
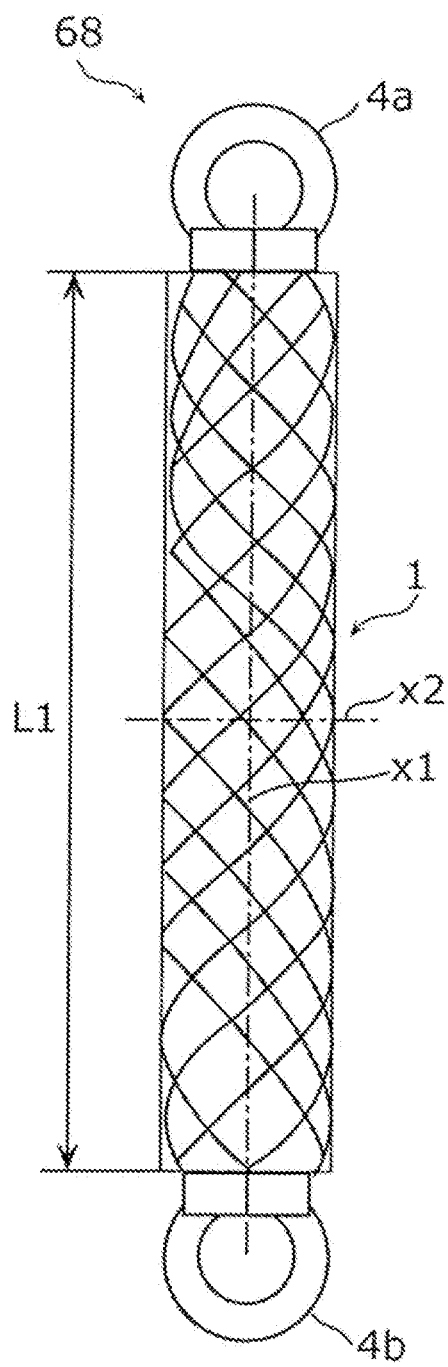
FIG. 11B is a diagram showing a state in which the actuator band according to the embodiment has been heated.

FIG. 10 is a schematic diagram showing the actuator band 1 according to the embodiment. FIG. 11A is a diagram showing a state in which the actuator band 1 according to the embodiment is not heated. FIG. 11B is a diagram showing a state in which the actuator band 1 has been heated.

First, when an initial tension is applied in a state where the actuator band 1 is not heated, as shown in FIG. 10, each of the braided stitches forms substantially rhombus shapes each having an expanded diagonal line in the direction of the first axis x1 of the actuator band 1. In this way, the actuator band 1 is in an expanded state. In this case, the length of the actuator band 1 in the first axis x1 direction is L0 (see FIG. 11A). The plurality of the actuator single wires 13a and 13b intersect with each other to form the braided stitches. Specifically, the axis A1 along the actuator single wire 13a is inclined by an angle $\theta1$ with respect to the first axis x1, and the axis A2 along the actuator single wire 13b is inclined by an angle $\theta2$ with respect to the first axis x1. For example, as for intersection angles formed by the crossing of the actuator single wires 13a and 13b, the intersection angle including the first axis x1 is ($\theta1+\theta2$), and the intersection angle including the second axis x2 is ($180°-\theta1-\theta2$).

In this way, since the plurality of the actuator single wires 13a and 13b intersect with each other, the initial tension applied along the first axis x1 direction of the actuator band 1 is distributed in directions parallel to the axis A1 along the actuator single wire 13a and parallel to the axis A2 along the actuator single wire 13b. In this way, the initial tension applied to each of the actuator single wires 13a and 13b is averaged. As a result, the initial tension is applied almost uniformly to the actuator single wires 13a and 13b.

Next, when the actuator band 1 is heated, as shown in FIG. 11B, the actuator wire 11 is contracted due to thermal strain, and the braided stitches of the actuator band 1 are deformed. Specifically, the braided stitches are deformed in such a manner that the intersection angle including the first axis x1 is greater than the above-mentioned intersection angle ($\theta 1+\theta 2$), and the intersection angle including the second axis x2 is smaller than the above-mentioned intersection angle ($180°-\theta 1-\theta 2$). As a result, the length of the actuator band 1 is shortened along the direction of the first axis x1. At this time, the length of the actuator band 1 in the first axis x1 direction is L1 (<L0). Since the actuator band 1 is expanded and contracted due to the deformation of the braided stitches, the movement of the expansion and contraction is not hindered at the point where the actuator single wires 13a and 13b intersect each other. This effect can be provided, even when the stitches of the actuator band 1 are knitted stitches or woven stitches.

In order for the mesh-shaped heating element 12 to be uniformly deformed in conjunction with the expansion and contraction of the actuator wire 11, it is desirable that the heating wires 21a and 21b have elasticity and small rigidity. In the actuator device 60, it is desirable that the initial tension applied to the actuator band 1 is as small as possible, and that the contraction ratio of the actuator band 1 during heating is as high as possible. In other words, it is desirable that a ratio of the contraction ratio of the actuator band 1 to the initial tension is as large as possible.

EXAMPLES

Hereinafter, examples according to the present invention will be described.

(Manufacture of Actuator Wire)

In accordance with the disclosure of Patent Literature 3, the present inventors provided coiled polymer fibers 111. Next, the present inventors twisted two coiled polymer fibers 111 to provide an actuator wire 11. As shown in FIG. 3, the actuator wire 11 is composed of the two coiled polymer fibers 111 which had been twisted with each other. In other words, a side surface of one twisted coiled polymer fiber 111a is in contact with a side surface of another twisted coiled polymer fiber 111b.

(Manufacture of Heating Wire)

A monofilament formed of polyester (manufactured by Toray Industries, Inc., fiber diameter: 10 denier) was used as the elastic yarn 51. A metal wire 52 (Nippon Seisen Co., Ltd., trade name: stainless steel wire, material: SUS 316L, diameter size: 0.030 mm) was braided around the elastic yarn 51 in S-twist (the number of the twist: 2,950 T/m). In this way, the present inventors provided the heating wire 21.

(Manufacture of Actuator Single Wire)

The present inventors used a braider to cover the side surface of the actuator wire 11 with a mesh-shaped heating element 12 composed of four heating wires 21. In this way an actuator single wire 13 was provided.

(Manufacture of Actuator Band)

The present inventors performed the flat braiding using nine actuator single wires 13 to provide the actuator band 1. Subsequently, the actuator band 1 was cut to provide an actuator band 1 having a length of approximately 70 mm.

(Connection with Connector)

The first connector 4a formed of a metal was connected to the first end of the actuator band 1 using a swaging tool. Similarly, the second connector 4b formed of a metal was connected to the second end of the actuator band 1. In this way, the present inventors provided the actuator member 68. Subsequently, the present inventors performed a heating test of the actuator band 1, and observed the expansion-contraction state of the actuator band 1.

(Heating Test)

Figure 12:
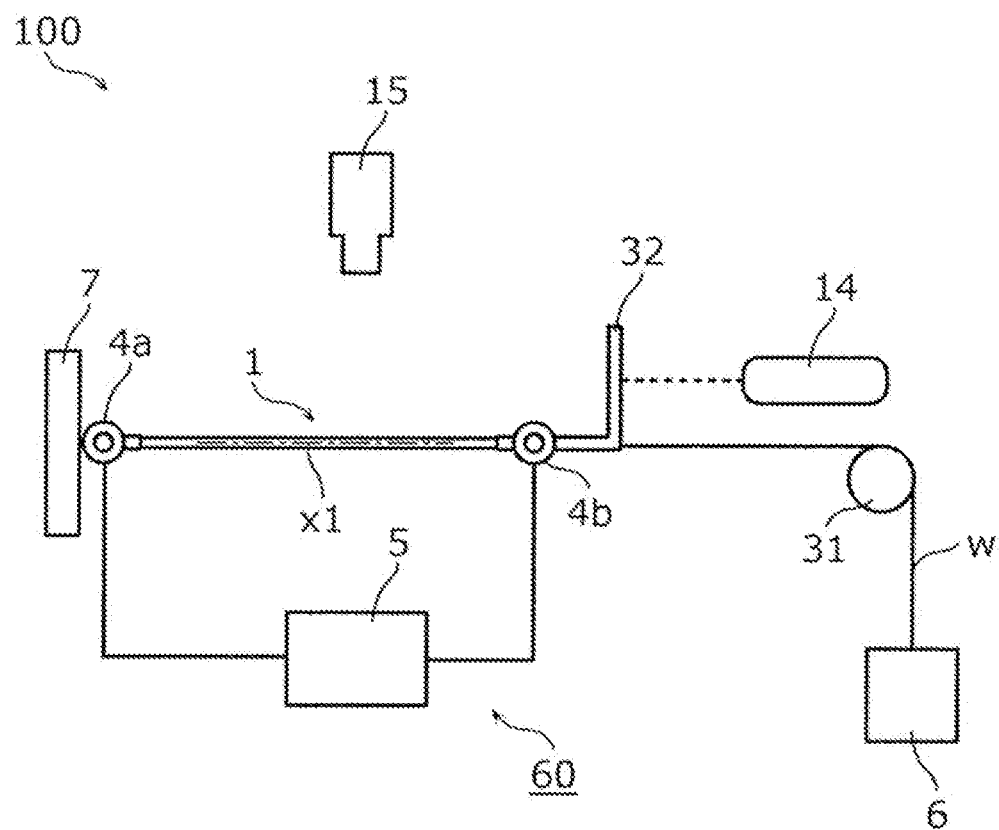
FIG. 12 is a schematic diagram of a testing device which is used for a heating test.
Figure 13:
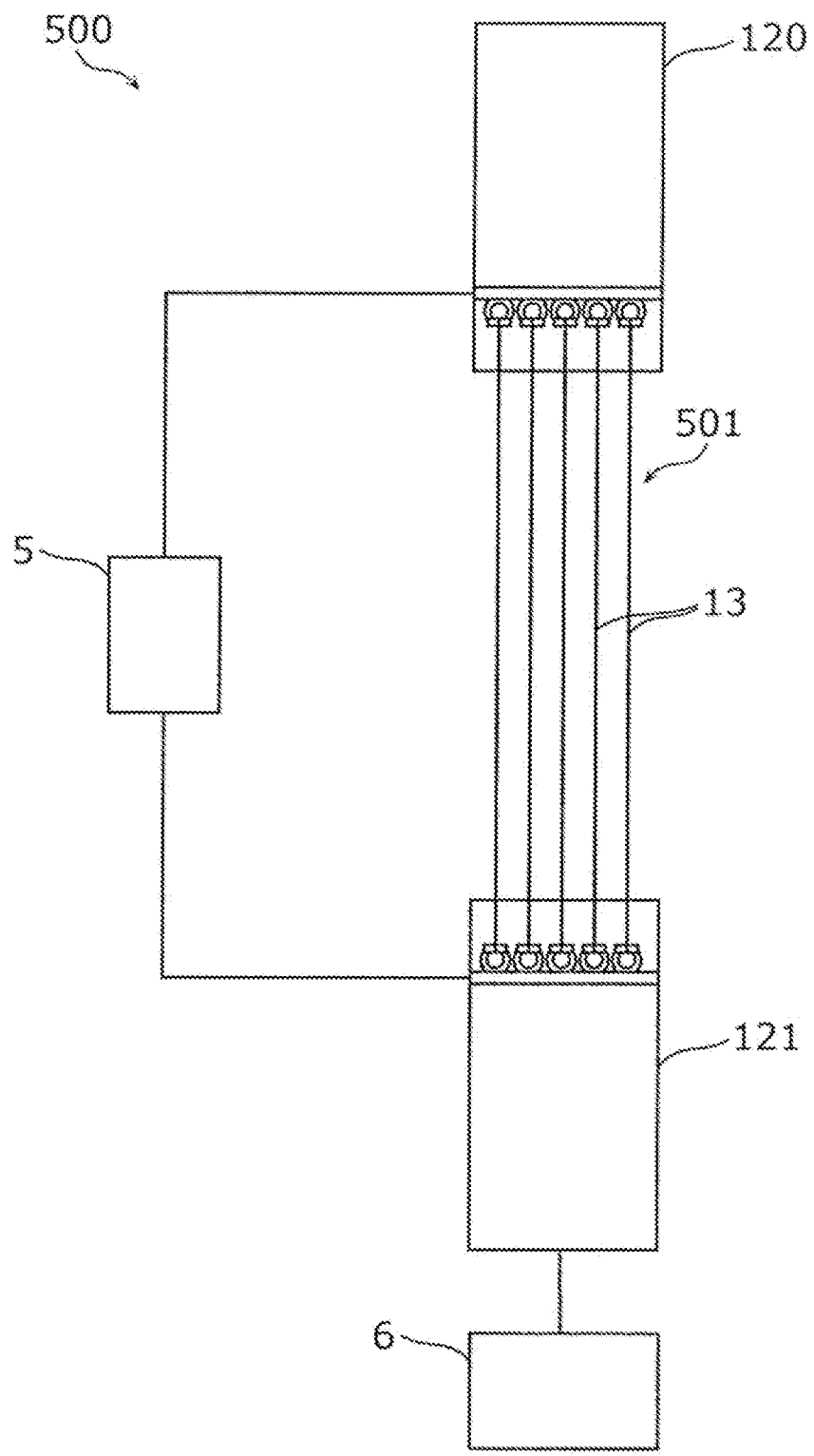
FIG. 13 is a schematic diagram showing an actuator device according to comparative example 1.

Next, the heating test for the actuator band 1 will be described. FIG. 12 is a schematic diagram of a test device 100 which is used for the heating test. The test device 100 comprises a fixing plate 7, a pulley 31, a mirror 32, a radiation thermometer 15, and a laser displacement meter 14.

The first connector 4a was fixed using the fixing plate 7. The pulley 31 is a pulley that guides the electric wire W attached to the second connector 4b on the second end of the actuator band 1. The actuator band 1 is disposed substantially horizontally with the fixing plate 7 and the pulley 31. For example, a weight 6 of 500 g is attached to the electric wire W. Due to the initial tension by the weight 6, the actuator band 1 is turned into an expanded state (see, for example, FIG. 11A). The second connector 4b of the actuator band 1 is movable along the direction of the first axis x1 in conjunction with the expansion and contraction of the actuator band 1.

The mirror 32 is attached to the second connector 4b of the actuator band 1, and configured to move in the direction of the first axis x1 in conjunction with the movement of the second connector 4b. The mirror surface of the mirror 32 is provided along a direction perpendicular to the first axis x1, and the laser displacement meter 14 is disposed at a position facing the mirror surface of the mirror 32. In the examples, the laser displacement meter 14 (purchased from Keyence Corporation, trade name "LK-080") was used. The laser displacement meter 14 measures the displacement of the second connector 4b by irradiating the mirror 32 with laser light and detecting the laser light reflected by the mirror 32. In other words, the laser displacement meter 14 measures the displacement of the actuator band 1.

The radiation thermometer 15 is disposed at a position where infrared or visible light emitted from the actuator band 1 can be detected, and measures the temperature of the actuator band 1 based on the detected infrared or visible light. In the examples, the radiation thermometer 15 (product of Apiste, trade name "FSV-210") was used.

The present inventors used the control device 5 to supply electric power of 1 W having electric current of 420 mA to the mesh-shaped heating element 12 for 30 seconds. At this time, the temperature of the side surface of the actuator band 1 reached approximately 70 degrees Celsius. Due to the heating, the actuator band 1 was contracted in the first axis x1 direction. Subsequently, the supply of the electric power to the mesh-shaped heating element 12 was stopped, and the mesh-shaped heating element 12 was cooled for 90 seconds. In this way, the actuator band 1 was naturally cooled, until the temperature of the side surface of the actuator band 1 reached not more than 30 degrees Celsius.

Due to the release of the heat, the actuator band 1 was expanded and restored in the direction of the first axis x1. As the actuator band 1 was contracted and restored, the mirror 32 was moved in an oscillation way in the longitudinal direction of the actuator band 1. The movement was measured using the laser displacement meter 14 to measure the movement of the expansion and contraction of the actuator band 1.

In the first heating test, 300 g of the weight of the weight 6 was used. The actuator band 1 comprises nine actuator single wires 13. Therefore, in this case, a load (M1) per one actuator single wire 13 was 33.3 g (=300 g/9 wires). In the heating test, heating and cooling of the actuator band 1 were repeated three times.

The second heating test was performed in the same manner as the first heating test, except that the weight of the weight 6 was 400 grams. In this case, the load (M1) per one actuator single wire 13 was 44.4 g (=400 g/9 wires).

The third heating test was performed in the same manner as the first heating test, except that the weight of the weight 6 was 500 grams. In this case, the load (M1) per one actuator single wire 13 was 55.6 g (=500 g/9 wires).

Table 1 shows the load (M1) per one actuator single wire 13 and the contraction amount and the contraction ratio (C) of the actuator band 1 when the heating and the cooling are repeated three times. The contraction ratio (C) is defined by the following mathematical formula (IA).

$$C=|L1-L0|/L0\times100 \quad (IA)$$

where, L0 represents the length of the actuator band 1 to which the initial tension (the initial load) has been applied before heating, namely, the length of the actuator band in the cooling state, and L1 represents the length of the actuator band 1 during heating.

Table 1 also shows a degree of the contraction (C/M1) in a unit load provided by dividing the contraction ratio (C) by the load (M1) per one actuator single wire 13. The degree of the contraction in the unit load (C/M1) is a value representing the contraction ratio in terms of the unit load so that the calculated contraction ratio C can be compared. It is preferable that the degree of the contraction is as large as possible. The degree of the contraction (C/M1) has a correlation with the ratio of the contraction ratio to the initial tension. Hereinafter, the actuator single wire 13 may be referred to as a "single wire".

TABLE 1

| Load M1 (g/wires) | Length L0 (mm) | Length L1 (mm) | Amount of Contraction \|L1 − L0\| (mm) | Contraction Ratio C (%) | Degree of Contraction (C/M1) |
|---|---|---|---|---|---|
| 33.3 | 84.4 | 78.3 | 6.1 | 7.2 | 0.22 |
| 44.4 | 89.5 | 82.6 | 6.9 | 7.7 | 0.17 |
| 55.6 | 94.4 | 87.7 | 6.6 | 7.0 | 0.13 |

M1: Load per one single wire
L0: Length of actuator band in the cooling state
L1: Length of actuator band during heating
|L1 − L0|: Amount of contraction of actuator band
C: Contraction ratio
C/M1: Degree of contraction in unit load In the actuator band 1 of the inventive example, the contraction ratio (C) was the largest when the load (M1) per one single wire was 44.4 g, and the maximum contraction ratio (C) was 7.7%. In addition, the degree of contraction (C/M1) was the largest when the load per one single wire (M1) was 33.3 g, and the maximum degree of the contraction (C/M1) was 0.22.

Comparative Example 1

Here, in order to describe the effect of the actuator device 60 of the present inventive examples, the actuator device 500 of the comparative example 1 will be described.

In the comparative example 1, an actuator band 501 in which five actuator single wires 13 were arranged in parallel at intervals was used. In the actuator device 500 of the comparative example 1, the first ends of the actuator single wires 13 each having a length of 120 mm were fixed to a band jig 120, and the second ends of the actuator single wires 13 were fixed to a band jig 121. The first ends and the second ends of the actuator single wires 13 were connected to the control device 5 with conducting wires provided on the band jigs 120 and 121. An initial tension was applied to the actuator single wires 13 using the weight 6. In the first heating test and the second heating test, 150 g of the weight 6 and 200 g of the weight 6 were used, respectively.

Then, electric current of 158 mA and electric power of 0.8 W were supplied using the control device 5 to the mesh-shaped heating element 12 for 90 seconds to heat the five actuator single wires 13. At this time, the temperature of the side surfaces of the actuator single wires 13 reached approximately 70 degrees Celsius. Subsequently, the supply of the electric power to the mesh-shaped heating element 12 was stopped, and the mesh-shaped heating element 12 was cooled for 90 seconds. In this way, the actuator single wires 13 was naturally cooled, until the temperature of the side surfaces of the actuator single wires 13 reached not more than 30 degrees Celsius. The temperature of the actuator single wire 13 arranged at the center of the five actuator single wires 13 was monitored.

Table 2 shows the load (M1) per one actuator single wire 13, the contraction amount and contraction ratio (C) of the actuator band 501 after the third heating and cooling, and the degree of contraction (C/M1) in the unit load.

TABLE 2

| Load M1 (g/wires) | Length L0 (mm) | Length L1 (mm) | Amount of Contraction \|L1 − L0\| (mm) | Contraction Ratio C (%) | Degree of Contraction (C/M1) |
|---|---|---|---|---|---|
| 30 | 127.8 | 123.8 | 4.0 | 3.1 | 0.10 |
| 40 | 130.6 | 126.8 | 3.8 | 2.9 | 0.07 |

M1: Load per one single wire
L0: Length of actuator band during cooling
L1: Length of actuator band during heating
|L1 − L0|: Amount of contraction of actuator band
C: Contraction ratio
C/M1: Degree of contraction in unit load In the actuator band 501 of the comparative example 1, the contraction ratio (C) was the largest when the load (M1) per one single wire was 30 g, and the maximum contraction ratio (C) was 3.1%. The degree of contraction (C/M1) was the largest when the load (M1) per one single wire was 30 g, and the maximum degree of contraction (C/M1) was 0.10.

As just described, the degree of contraction (C/M1) of the actuator band 501 of the comparative example 1 is smaller than the degree of contraction (C/M1) of the actuator band 501 of the present inventive examples. This is probably because a uniform load was not applied to all of the five actuator single wires 13 and the temperature of the five actuator single wires 13 was not uniform.

On the other hand, in the present inventive examples, the actuator band 1 is formed by braiding the actuator single wires 13 so as to intersect each other. As a result, a uniform load is easily applied to the actuator band 1, and the entire temperature of the actuator band 1 is easily made uniform. In this way, the actuator band 1 having a large ratio of the contraction ratio to the initial tension can be provided.

Comparative Example 2

In addition, in order to describe the effect of the actuator device 60 of the present inventive examples, the actuator device of the comparative example 2 will be described.

In the comparative example 2, an actuator member was produced in the same manner as in the inventive example, except that an actuator band (not shown) having only one actuator single wire 13 was used. The length of the actuator single wire 13 was approximately 50 mm.

In the first to fifth heating tests, 10 g, 20 g, 30 g, 40 g, and 50 g of the weights 6 were used, respectively. Using the control device 5, electric current of 110 mA and electric power of 0.34 W were supplied to the mesh-shaped heating element 12 for 10 seconds to heat the actuator single wire 13. At this time, the temperature of the side surface of the actuator single wire 13 reached approximately 70 degrees Celsius. Subsequently, the supply of electric power to the mesh-shaped heating element 12 was stopped, and the mesh-shaped heating element 12 was cooled for 30 seconds. In this way, the actuator single wire 13 was naturally cooled, until the temperature of the side surface of the actuator single wire 13 reached not more than 30 degrees Celsius.

Table 3 shows the load (M1) per one actuator single wire 13, the contraction amount and contraction ratio (C) of the actuator band after heating and cooling are repeated three times, and the degree of contraction (C/M1) in the unit load.

TABLE 3

| Load M1 (g/wires) | Length L0 (mm) | Length L1 (mm) | Amount of Contraction \|L1 − L0\| (mm) | Contraction Ratio C (%) | Degree of Contraction (C/M1) |
| --- | --- | --- | --- | --- | --- |
| 50 | 56.3 | 52.0 | 4.3 | 7.6 | 0.15 |
| 40 | 55.0 | 51.2 | 3.9 | 7.0 | 0.18 |
| 30 | 53.1 | 50.5 | 2.5 | 4.7 | 0.16 |
| 20 | 50.8 | 49.9 | 0.9 | 1.8 | 0.09 |
| 10 | 49.4 | 49.1 | 0.2 | 0.5 | 0.05 |

M1: Load per one single wire
L0: Length of actuator band in the cooling state
L1: Length of actuator band during heating
\|L1 − L0\|: Amount of contraction of actuator band
C: Contraction ratio
C/M1: Degree of contraction in unit load In the actuator band of the comparative example 2, namely, one actuator single wire 13, the contraction ratio (C) is the largest when the load (M1) per one single wire was 50 g, and the maximum contraction ratio (C) was 7.6%. The degree of contraction (C/M1) was the largest when the load (M1) per one single wire was 40 g, and the maximum degree of contraction (C/M1) was 0.18.

As can be seen from Table 1 and Table 3, the actuator band 1 of the present inventive example has the same contraction ratio C and degree of contraction (C/M1) as the one actuator single wire 13 of the comparative example 2.

Here, the present inventors will discuss that the contraction ratio C and the degree of contraction (C/M1) of the present inventive examples are the same as those of the comparative example 2. The displacement direction displaced by heating and cooling the one actuator single wire 13 of the comparative example 2 is a direction along the longitudinal direction of the actuator single wire 13. For this reason, a skilled person would believe, if the actuator single wire 13 is disposed at an angle θ1 (FIG. 10) with respect to the first axis x1 in the present inventive examples, the displacement amount of the actuator band 1 in the first axis x1 direction would be decreased by (amount of displacement in the axis A1 direction of the actuator single wire)×(1−cos θ1). However, as shown in Table 1, in the present inventive examples, the contraction ratio C and the degree of contraction (C/M1) are equivalent to those of the one actuator single wire 13. This is probably because the actuator band 1 has a structure in which tension is applied in the direction of the first axis x1 in a state where a plurality of the actuator single wires 13 are braided so as to intersect each other.

INDUSTRIAL APPLICABILITY

The present invention is applicable to an actuator device which is used as an artificial muscle.

CONFIGURATION AND EFFECT OF THE PRESENT INVENTION

As described above, the actuator device 60 according to the embodiment comprises
an actuator band 1; and
a control device 5,
wherein
the actuator band 1 comprises a plurality of actuator single wires 13;
the plurality of the actuator single wires 13 are braided, knitted or woven;
first ends of the plurality of the actuator single wires 13 are connected to each other;
second ends of the plurality of the actuator single wires 13 are connected to each other;
each of the plurality of the actuator single wires 13 comprises an actuator wire 11 and a mesh-shaped heating element 12 which covers a side surface of the actuator wire 11 and comprises a plurality of heating wires 21;
the actuator wire 11 is formed of a fiber 111 consisting of a polymer (i.e. polymer fiber having a shape of a coil);
the fiber 111 is twisted around the long axis thereof;
the fiber 111 is folded so as to have a shape of a cylindrical coil;
the actuator wire 11 is contracted by heat and restored by release of the heat;
a first end of the mesh-shaped heating element 12 is connected to a first end of the actuator wire 11;
a second end of the mesh-shaped heating element 12 is connected to a second end of the actuator wire 11;
the control device 5 is configured to supply, to the mesh-shaped heating element 12, electric power for heating the mesh-shaped heating element 12; and
the actuator band 1 is configured to be contracted along the longitudinal direction thereof by the heat in a state where tension has been applied along the longitudinal direction thereof.

In addition, the actuator band 1 according to the embodiment is an actuator band comprising a plurality of actuator single wires 13, wherein the plurality of the actuator single wires 13 are braided, knitted or woven; first ends of the plurality of the actuator single wires 13 are connected to each other;
second ends of the plurality of the actuator single wires 13 are connected to each other;
each of the plurality of the actuator single wires 13 comprises an actuator wire 11, and a mesh-shaped heating element 12 which covers a side surface of the actuator wire 11 and comprises a plurality of heating wires 21;
the actuator wire 11 is formed of a fiber 111 consisting of a polymer;
the fiber 111 is twisted around the long axis thereof;
the fiber 111 is folded so as to have a shape of a cylindrical coil;
the actuator wire 11 is contracted by heat and restored by release of the heat;

a first end of the mesh-shaped heating element 12 is connected to a first end of the actuator wire 11; and a second end of the mesh-shaped heating element 12 is connected to a second end of the actuator wire 11.

In addition, the manufacture method of the actuator band 1 according to the embodiment comprises:

(a) forming an actuator wire 11 capable of being contracted by heat and restored by release of the heat; wherein the actuator wire 11 is formed by twisting a plurality of fiber 111s each consisting of a polymer with each other;

each of the plurality of the fiber 111s is twisted around the long axis thereof; and each of the plurality of the fiber 111s is folded so as to have a cylindrical coil shape;

(b) providing a side surface of the actuator wire 11 with a mesh-shaped heating element 12 to provide an actuator single wire;

(b2) preparing a plurality of actuator single wires 13 each consisting of the actuator single wire; and (c) braiding, knitting, or weaving the plurality of the actuator single wires 13 to provide the actuator band 1.

As just described, the plurality of the actuator single wires 13 are braided, knitted, or woven to form the actuator band 1, so that, for example, the actuator band 1 having a large ratio of the contraction ratio to the initial tension can be provided, as compared to a case where an actuator band is formed by arranging the plurality of the actuator single wires 13 in parallel at intervals.

In addition, the plurality of the actuator single wires may intersect each other.

As just described, the actuator band 1 is formed in such a manner that the plurality of the actuator single wires 13 intersect each other, so that, for example, the actuator band 1 having a large ratio of the contraction ratio to the initial tension can be provided, as compared to a case where an actuator band is formed by arranging the plurality of the actuator single wires 13 without intersecting each other.

In addition, each of the plurality of the heating wires 21 may comprise non-conductive elastic yarn 51 and a metal wire 52, and the metal wire 52 may be helically wound around the elastic yarn.

In this case, since the heating wire 21 in which the metal wire 52 has been wound around the elastic yarn 51 is used, a close contact area between the metal wire 52 and the actuator wire 11 can be increased, and the thermal efficiency can be increased. In this way, the actuator band 1 having a large ratio of the contraction ratio to the initial tension can be provided.

In addition, each of the plurality of the heating wires 21 may be helically wound around the side surface of the actuator wire 11, and the plurality of the heating wires 21 may be braided so as to form the mesh-shaped heating element 12.

In this case, the mesh-shaped heating element 12 can be brought into close contact with the actuator wire 11, and the thermal efficiency can be increased. In this way, the actuator band 1 having a large ratio of the contraction ratio to the initial tension can be provided.

In addition, the plurality of the heating wires 21 may be braided clockwise.

In this case, the heating wire 21 is less likely to come off from the actuator wire 11.

In addition, the plurality of the heating wires 21 may be braided counterclockwise.

In this case, the heating wire 21 is less likely to come off from the actuator wire 11.

In addition, each of the plurality of the heating wires 21 may have a rectangular wave shape, and the plurality of the heating wires 21 each having the rectangular wave shape may be knitted so as to form the mesh-shaped heating element 12.

In this case, the mesh-shaped heating element 12 can be brought into close contact with the actuator wire 11, and the thermal efficiency can be increased. In this way, the actuator band 1 having a large ratio of the contraction ratio to the initial tension can be provided.

In addition, each of the plurality of the heating wires 21 may be helically wound around the side surface of the actuator wire 11, and the plurality of the heating wires 21 may be woven so as to form the mesh-shaped heating element 12.

In this case, the mesh-shaped heating element 12 can be brought into close contact with the actuator wire 11, and the thermal efficiency can be increased. In this way, the actuator band 1 having a large ratio of the contraction ratio to the initial tension can be provided.

In addition, the fiber 111 consists of linear low density polyethylene, and the following numerical formula (I) is satisfied.

$$D/d<1 \qquad (I)$$

where D represents an average diameter of the cylindrical coil, and d represents a diameter of the fiber.

Due to this relationship, the displacement rate of the actuator wire 11 can be increased.

In addition, the actuator band may comprises:

a first connector 4a; and a second connector 4b, wherein the first ends of the plurality of the actuator single wires 13 are connected to each other with the first connector 4a;

the second ends of the plurality of the actuator single wires 13 are connected to each other with the second connector 4b;

the first end of the mesh-shaped heating element 12 is connected to the first end of the actuator wire 11 with the first connector 4a; and second end of the mesh-shaped heating element 12 is connected to second end of the actuator wire 11 with the second connector 4b.

In this case, since the first ends of the plurality of the heating wires 21 and the plurality of the actuator wires 11 are connected with the first connector 4a, and the second ends of the plurality of the heating wires 21 and the plurality of the actuator wires 11 are connected with the second connector 4b, these can be connected to each other with a simple configuration. In particular, if the first connector 4a and the second connector 4b are formed of a metal, the heat from the heating wire 21 can be released through the first connector 4a and the second connector 4b, and the burnout of both ends of the actuator band 1 can be suppressed.

[Others]

Although the actuator device, the actuator band, and the method for manufacturing the actuator band according to the present invention have been described based on the above embodiment, the present invention is not limited to the above embodiment.

For example, in the above embodiment, the case where the mesh-shaped heating element 12 is a braided fabric has been described. However, the mesh-shaped heating element may be a woven fabric or a knitted fabric.

In addition, in the above embodiment, the case where the length along the first axial direction from the first end of the actuator band 1 to the second end thereof is longer than the length (width) of the second axial direction perpendicular to the first axial direction has been described. However, in the actuator band, the width may be greater than or equal to the length in the first axial direction.

In addition, the present invention includes an embodiment which can be provided by subjecting each embodiment to various modifications conceived by those skilled in the art. The present invention also includes an embodiment which can be realized by arbitrarily combining the constituent elements and functions in each embodiment without departing from the scope of the present invention.

REFERENCE SIGNS LIST

1 Actuator band
4a First connector
4b Second connector
5 Control device
6 Weight
7 Fixing plate
10 Substrate
11 Actuator wire
12 Mesh-shaped heating element
13a, 13b Actuator single wire
14 Laser displacement meter
15 Radiation thermometer
21a, 21b Heating wire
31 Pulley
32 Mirror
51 Elastic yarn
52 Metal wire
60 Actuator device
100 Test device
111, 111a, 111b Coiled polymer fiber
A1, A2 Axis along actuator single wire
x1 First axis
x2 Second axis
W electric wire

The invention claimed is:

1. An actuator device, comprising:
an actuator band; and
a control device,
wherein
the actuator band comprises a plurality of actuator single wires;
the plurality of the actuator single wires are braided, knitted or woven;
first ends of the plurality of the actuator single wires are connected to each other;
second ends of the plurality of the actuator single wires are connected to each other;
each of the plurality of the actuator single wires comprises an actuator wire and a mesh-shaped heating element which covers a side surface of the actuator wire and comprises a plurality of heating wires;
the actuator wire is formed of a fiber consisting of a polymer;
the fiber is twisted around the long axis thereof;
the fiber is folded so as to have a shape of a cylindrical coil;
the actuator wire is contracted by heat and restored by release of the heat;
a first end of the mesh-shaped heating element is connected to a first end of the actuator wire;
a second end of the mesh-shaped heating element is connected to a second end of the actuator wire;
the control device is configured to supply, to the mesh-shaped heating element, electric power for heating the mesh-shaped heating element; and
the actuator band is configured to be contracted along the longitudinal direction thereof by the heat in a state where tension has been applied along the longitudinal direction thereof.

2. The actuator device according to claim 1, wherein the plurality of the actuator single wires intersect each other.

3. The actuator device according to claim 1, wherein each of the plurality of the heating wires comprises non-conductive elastic yarn and a metal wire; and the metal wire is helically wound around the elastic yarn.

4. The actuator device according to claim 1, wherein each of the plurality of the heating wires is helically wound around the side surface of the actuator wire; and the plurality of the heating wires are braided so as to form the mesh-shaped heating element.

5. The actuator device according to claim 4, wherein the plurality of the heating wires are braided clockwise.

6. The actuator device according to claim 4, wherein the plurality of the heating wires are braided counter-clockwise.

7. The actuator device according to claim 1, wherein each of the plurality of the heating wires has a rectangular wave shape; and
the plurality of the heating wires each having the rectangular wave shape are knitted so as to form the mesh-shaped heating element.

8. The actuator device according to claim 1, wherein each of the plurality of the heating wires is helically wound around the side surface of the actuator wire; and the plurality of the heating wires are woven so as to form the mesh-shaped heating element.

9. The actuator device according to claim 1, wherein the fiber is formed of linear low density polyethylene; and the following formula (I) is satisfied:

$$D/d < 1 \quad (I)$$

where
D represents an average diameter of the cylindrical coil; and
d represents a diameter of the fiber.

10. An actuator band comprising a plurality of actuator single wires, wherein
the plurality of the actuator single wires are braided, knitted or woven;
first ends of the plurality of the actuator single wires are connected to each other;
second ends of the plurality of the actuator single wires are connected to each other;
each of the plurality of the actuator single wires comprises an actuator wire, and a mesh-shaped heating element which covers a side surface of the actuator wire and comprises a plurality of heating wires;
the actuator wire is formed of a fiber consisting of a polymer;
the fiber is twisted around the long axis thereof;
the fiber is folded so as to have a shape of a cylindrical coil;
the actuator wire is contracted by heat and restored by release of the heat;
a first end of the mesh-shaped heating element is connected to a first end of the actuator wire; and a second end of the mesh-shaped heating element is connected to a second end of the actuator wire, wherein the actuator band is configured to be contracted along the longitudinal direction thereof by heat in a state where tension has been applied along the longitudinal direction thereof, the heat provided by supplying power to the mesh-shaped heating element.

11. The actuator band according to claim 10, wherein the plurality of the actuator single wires intersect each other.

12. The actuator band according to claim 10, wherein each of the plurality of the heating wires comprises non-conductive elastic yarn and a metal wire; and
the metal wire is helically wound around the elastic yarn.

13. The actuator band according to claim 10, wherein each of the plurality of the heating wires is helically wound around the side surface of the actuator wire; and
the plurality of the heating wires are braided so as to form the mesh-shaped heating element.

14. The actuator band according to claim 13, wherein the plurality of the heating wires are braided clockwise.

15. The actuator band according to claim 13, wherein the plurality of the heating wires are braided counter-clockwise.

16. The actuator band according to claim 10, wherein each of the plurality of the heating wires has a rectangular wave shape; and
the plurality of the heating wires each having the rectangular wave shape are knitted so as to form the mesh-shaped heating element.

17. The actuator band according to claim 10, wherein each of the plurality of the heating wires is helically wound around the side surface of the actuator wire; and
the plurality of the heating wires are woven so as to form the mesh-shaped heating element.

18. The actuator band according to claim 10, wherein the fiber is formed of linear low density polyethylene; and the following formula (I) is satisfied:

$$D/d<1 \qquad (I)$$

where
D represents an average diameter of the cylindrical coil; and
d represents a diameter of the fiber.

19. The actuator band according to claim 10, further comprising:
a first connector; and
a second connector,
wherein
the first ends of the plurality of the actuator single wires are connected to each other with the first connector;
the second ends of the plurality of the actuator single wires are connected to each other with the second connector;
the first end of the mesh-shaped heating element is connected to the first end of the actuator wire with the first connector; and
second end of the mesh-shaped heating element is connected to second end of the actuator wire with the second connector.

20. A method for manufacturing the actuator band according to claim 10, the method comprising:
(a) forming an actuator wire capable of being contracted by heat and restored by release of the heat;
wherein
the actuator wire is formed by twisting a plurality of fibers each consisting of a polymer with each other;
each of the plurality of the fibers is twisted around the long axis thereof; and
each of the plurality of the fibers is folded so as to have a cylindrical coil shape;
(b) providing a side surface of the actuator wire with a mesh-shaped heating element to provide an actuator single wire;
(b2) preparing a plurality of actuator single wires each consisting of the actuator single wire; and
(c) braiding, knitting, or weaving the plurality of the actuator single wires to provide the actuator band.

* * * * *